United States Patent [19]

Beteré Cabeza

[11] Patent Number: 4,995,162

[45] Date of Patent: Feb. 26, 1991

[54] MATTRESS ASSEMBLY INSTALLATION USING POSITIONING ROBOT

[75] Inventor: Antonio Beteré Cabeza, Madrid, Spain

[73] Assignee: Fabricas Lucia Antonio Betere, S.A. (Flabesa), Madrid, Spain

[21] Appl. No.: 378,292

[22] Filed: Jul. 11, 1989

[30] Foreign Application Priority Data

Jul. 12, 1988 [ES] Spain .................................... 8802191
Apr. 6, 1989 [ES] Spain .................................... 8901202

[51] Int. Cl.[5] .......................... B23P 19/04; B68G 7/00
[52] U.S. Cl. .......................................... 29/564.2; 29/91
[58] Field of Search ................. 29/91, 91.1, 91.5, 460, 29/467, 564.3, 564.2, 711, 786; 156/148, 238, 510, 512, 516, 517, 556; 5/484; 198/726; 414/676

[56] References Cited

U.S. PATENT DOCUMENTS

| | | | |
|---|---|---|---|
| 2,382,226 | 8/1945 | Hodges, Jr. | 29/91 X |
| 3,873,388 | 3/1975 | Hunter | 156/148 |
| 4,602,975 | 7/1986 | Larsonneur | 156/238 X |
| 4,724,590 | 2/1988 | Langas et al. | 29/91 |
| 4,829,643 | 5/1989 | Ayres et al. | 29/91 |

FOREIGN PATENT DOCUMENTS

| | | | |
|---|---|---|---|
| 3042382 | 6/1981 | France | 29/91 |

*Primary Examiner*—Joseph M. Gorski
*Assistant Examiner*—Peter Dungba Vo
*Attorney, Agent, or Firm*—Wenderoth, Lind & Ponack

[57] ABSTRACT

The mattress assembly installation has a number of mattress padding material spools for supplying separate mattress padding materials. These materials are received and superposed in a receiving stage downstream of the spools. The mattress padding material portion is cut at a cutting station from the supply of materials. Subsequently, or at the same time, a gluing apparatus, which may be part of the cutting apparatus, deposits strips of adhesive on the superposed mattress padding materials. The materials are conveyed to a folding station where at the materials are folding above a spring frame together with an inverted mattress covering. A robot or a carriage is provided for moving, inverting and removing the spring frame from the folding station.

14 Claims, 4 Drawing Sheets

MATTRESS ASSEMBLY INSTALLATION USING POSITIONING ROBOT

BACKGROUND OF THE INVENTION

The present invention relates to a method as well as to an apparatus for the assembly of mattresses and which provides a number of extremely important advantages, which reside as much in a saving on assembly time as in a reduction in the labor used.

At the present time, and with reference to the state of the art, it should be mentioned that mattresses, and more specifically box-spring mattresses, are assembled by a method which is virtually manual, the human hand being involved in many of the operations, a fact which entails the incontestable difficulties of execution and irregularities in production. This results in different grades of finish in the assembly of such mattresses, which is why they are so clearly bettered by the object of the present invention, which constitutes an entirely automated mattress assembly plant.

SUMMARY OF THE INVENTION

Throughout the present description and claims, when reference is made to the assembly of mattresses, this will always refer to the location on one or both surfaces of the mattress of visible covers and corresponding internal shock absorbers, or solely the internal shock absorbers or springs, since the method and the plant will not vary. All that may change will be products constituting the covers over the surfaces of the mattress.

The plant and method according to the invention can be divided into various clearly defined stages or zones, attention being drawn firstly to the conformation of the shock-absorbing strip to be placed between the spring casing and the visible cover of the mattress, the material being properly constituted by the superimposition of various sheet elements such as a shock-absorbing strip of polyurethane or a material having similar characteristics, such as a braided type of plastic element used as a separation between the padding and the spring casing, which avoids damage to the padding.

The second of the stages in the plant consists of a pull-off unit and the feed of a predetermined quantity and subsequent cutting of the materials used for the shock-absorbing strip.

The third stage comprises a unit for transferring the cut material and moving the material to a folding unit, and also the application of adhesive to the material.

The fourth stage is a robotic or automated supply of spring casings for assembly on both sides with a turnover and subsequent withdrawal from the production line.

The mattress assembly method according to the invention comprises the following productive phases:

First there are spools which supply flat material for the shock absorber inside the mattress, that is to say materials to be situated between the spring casing and the visible cover of the mattress, the materials being superposed so that they can be cut to a predetermined size. The materials, already cut and superposed, are deposited on the transfer unit, which carries the cut materials to a folding station on top of which there is a longitudinal conveyor carriage which spreads adhesive, and which, taking advantage of the actual movement of the transfer unit, applies longitudinally any given number of regulable strips of adhesive to the materials, which are then superimposed so that they can be joined.

It should be mentioned that, before the materials of which the shock absorber is constituted are placed on the folding unit, a visible mattress cover will have been introduced onto the base of the folding unit, the shock absorbing material being placed on top of the visible cover.

Upon completion of feed to the folding unit, another transverse carriage superimposed on that which moves longitudinally moves and distributes another unspecified number of regulable strips of adhesive to the cut material, but this time in a transverse direction.

Positioning of the spring casing on top of the folding station can be carried out in two ways, as desired. First, it can be done by means of a spring casing supply robot which has arms into which a spring casing from the casing table will be placed. Once the robot has a spring casing between its grippers, it will turn and place the casing in the same axis as the assembly table on which, as has already been staged, will have been placed the assembly consisting of the visible cover of the mattress and the shock-absorbing material. From this moment, the robot will advance its position until it places the casing just on top of the assembly table, lowering it subsequently until it makes contact with the afore-described assembly. As a subsequent operation, jaws which are situated on the sides of the assembly table will be actuated by either hydraulic, pneumatic or electrical actuators, thus lowering and applying the lateral edges of the visible cover and filling on the lateral frame of the spring casing, so that it thus becomes fixed by the gluing carried out in previous operations and by the subsequent application of pressure.

Subsequently, and in order to cover the other side of the casing with an identical visible cover with an internal padding, the robot will proceed to withdraw the casing by raising the assembly table, the robot then withdrawing sufficiently so that it can rotate the casing through 180 degrees and then move forward and leave the casing on the assembly table. Simultaneously with the operation of withdrawing and turning over the spring casing, there will have firstly been deposited on the assembly table a mattress cover which will have been previously inverted and will have had adhesive applied to it to receive a fresh sheet or panel of padding material. Once this process has been completed, the robot will withdraw, moving back empty and turning to receive a fresh spring casing dispensed from the lateral casing supply table. Once the mattress has been assembled, it is withdrawn by any suitable means and moved to the final stage in the process.

Instead of having available a casing-supply robot, a second preferred embodiment comprising an automatic unit adapted for linear displacement along the corresponding supporting frame, which will pick up a spring casing, gripping it by suitable jaws applied centrally to the turns of the springs, raising the casing and setting it down on the folding unit on which perimetrical jaws fold the edges of the material placed there onto the geometrical edge of the spring casing, after which, and in order to make the other side of the spring casing, the automatic unit will raise it and rotate it through 180 degrees. The unit will then place it on the folding unit where assembly will be completed by a repetition of the previous operation. Subsequently, the automatic unit will set aside the resultant assembly and resume the process by picking up another spring casing.

BRIEF DESCRIPTION OF THE DRAWINGS

A detailed description of the invention follows, reference being made to the appended drawings, which show by way of example and implying no limitation whatsoever, a preferred form of embodiment of the invention, and in which.

DETAILED DESCRIPTION OF THE INVENTION

Figures 1A, 1B:
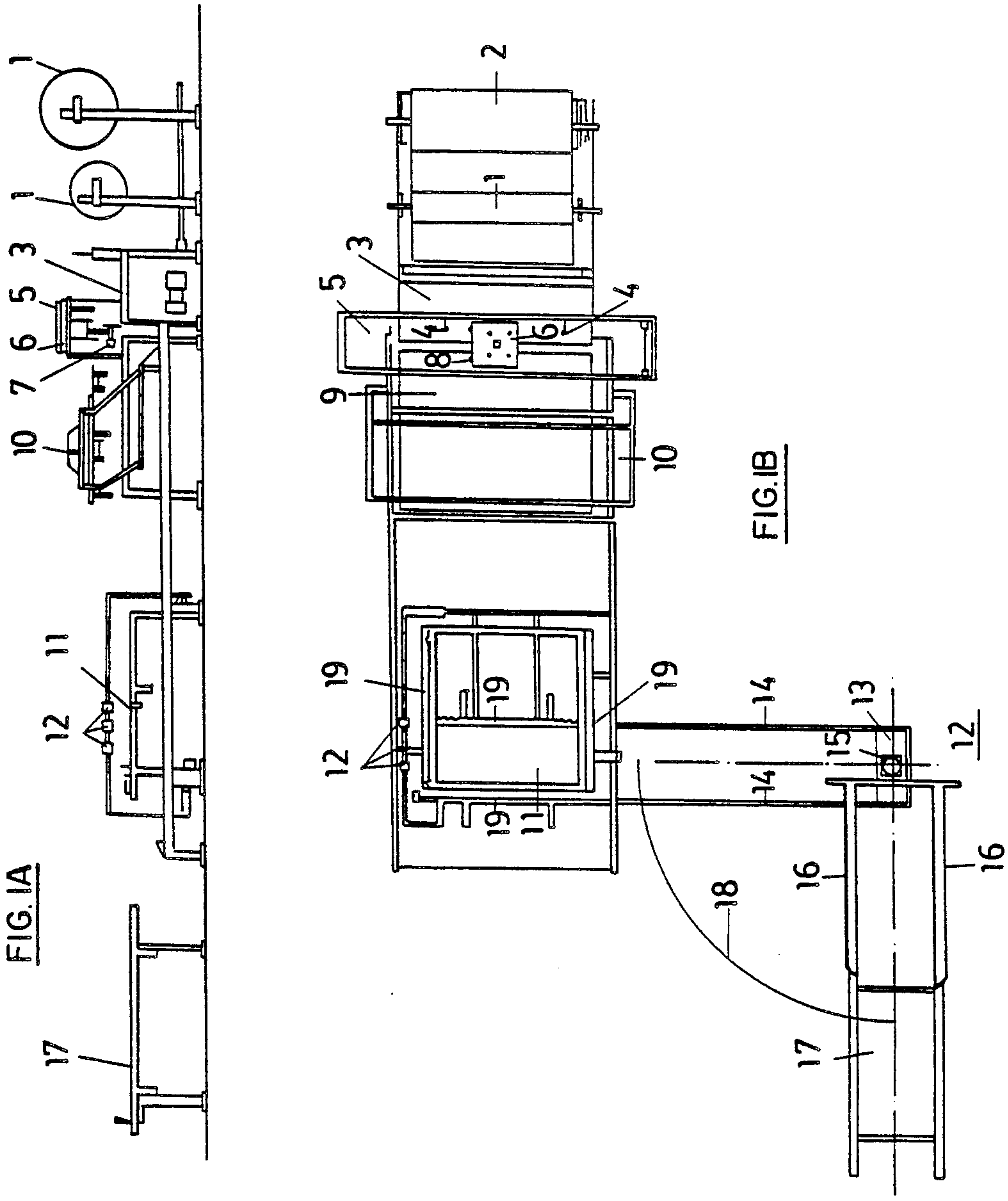
FIGS. 1(A) and 1(B) shows a plane and profile view of the installation for assembling mattresses according to the invention.
Figures 1, 2:
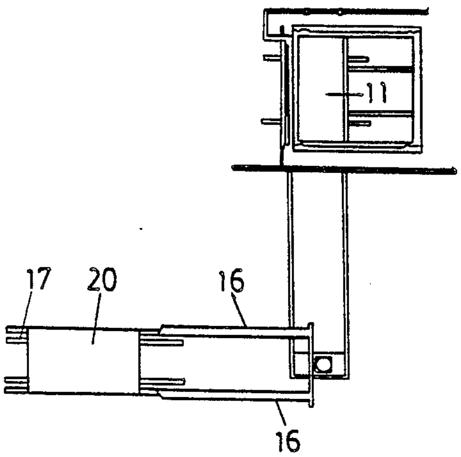
FIGS. 2-1 to 2-8 represent phases of a functioning process of a robot for supplying and turning over spring casings.

FIG. 1 shows a mattress assembly installation according to the invention, which initially comprises dispensing spools 1. Two superposed elements pass on to a table 3 from the spools where there are several laterally disposed orifices 4 through which regulable strips of adhesive can be deposited thereon. Due to the nature and constitution of the elements, gluing of the two will be facilitated by a grid, as the adhesive can pass through to the padding material. These orifices 4 will apply glue to both sides of the sheets in a continuous strip.

Subsequently, the resultant sheets passes to a second stage 5 in the process, where there is a device 6 adapted for movement crosswise to the direction of sheet feed movement, a feed and withdrawal movement being performed in each operation, respectively. In the feed movement, a saw or blade 7 situated in the device 6 will, at a predetermined dimension, cut the padding as required, while in the withdrawal movement, orifices 8 will deposit, on both sides of the cut, the adhesive required for the rear portion of one sheet, and the front part of a subsequent sheet.

Following the cutting and gluing stage 5, the resultant padding, which has been glued on its four lateral edges, is situated in a transfer unit 9, from which a vertical conveyor 10 picks up and moves the padding material to a folding unit 11. On the folding unit 11, there will have been previously deposited a visible mattress cover, there having been dispensed to the upper surface of the corner regulable strips of adhesive, dispensed through orifices 44, before the padding material is deposited from the conveyor 10. When the padding material is deposited, it then remains glued to the inverted visible cover of the cushion.

This folding unit 11 is constructed in such a way that it is readily adaptable to any production length and width by movement of two lateral jaws.

Situated in a position adjacent to the folding unit 11 is a robot 12 which has the task of carrying the spring casings to a position above the folding unit 11. The robot 12 comprises a carriage 13 adapted for displacement on appropriate rails 14 and having, rotatable upon itself, a head 15 carrying grippers 16, which are inserted into a spring casing coming from a casing table 17. The casing table 17 has a pull-off belt for moving the spring casings.

Once one of the casings has been moved and the grippers 16 have been introduced into the casing, the head of the robot 15 will rotate through a certain angle, as demonstrated by arc 18. The casing is placed in the same axis of positioning of the assembly table. Then, the carriage 13 moves forward on the rails 14 until the spring casing is positioned above the folding unit and lowers the casing onto the padding and the visible mattress cover, previously placed on the folding unit.

Once the spring casing has been placed on the folding unit 11, lateral jaws 19 are actuated by hydraulic, pneumatic or electrical actuators and fold over the lateral edges of the padding onto the frame of the casing and its perimetrical springs. The gluing carried out in earlier operations, and a subsequent application of pressure, result in the visible covering being firmly joined to the padding inside the spring casing. Once this operation has been carried out on one of the two sides, fixing of the opposite side remains to be carried out. For this the robot 12 will proceed to withdraw the spring casing from the assembly table. The carriage 13 withdraws, moving along the guides 14 to a withdrawn position, and the casing is rotated through 180 degrees. Subsequently, it moves forward, and a fresh casing is deposited on the folding unit, on which there will have been previously deposited a fresh visible mattress cover with its corresponding padding, both being joined by the deposit of adhesive between them.

The operation of joining the casing to the visible cover and its inner padding is repeated as previously described, by a lowering and application of pressure from the bottom, the jaws 19 being pressed on the frame and perimetral springs of the casing.

Once assembled on both sides, this casing will be transported to a subsequent stage in the assembly process which is beyond the content and interest of the present invention. The robot 12 withdraws by movement of the carriage 13 on the rails 14 into a withdrawn position where, by turning its head 15 in the direction opposite to that previously described, it will be in a suitable position to receive a fresh spring casing. The process is then repeated.

FIGS. 2-1 to 2-8 represent each and every one of the movements of the robot in feeding casings to the folding unit 11.

FIG. 2-1 shows how one of the casings 20 is situated on the respective table 17, while FIG. 2-2 shows the casing introduced between the retaining grippers 16 of the robot.

Figures 2, 3:
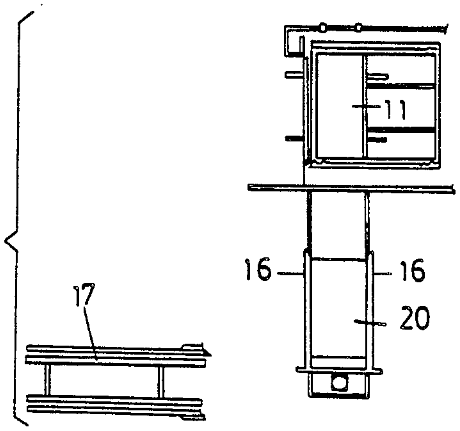
Figures 2, 3, 4:
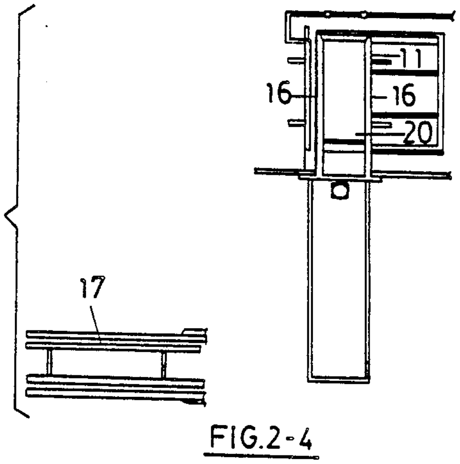
Figure 2:
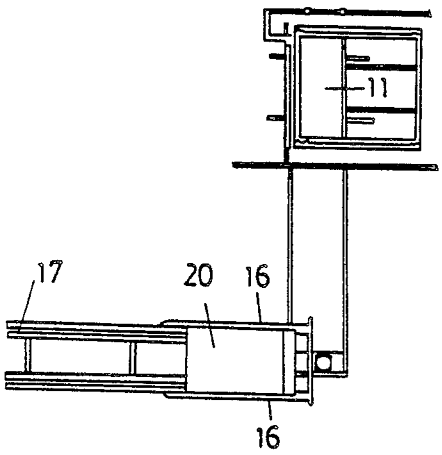
Figures 2, 3, 4, 5:
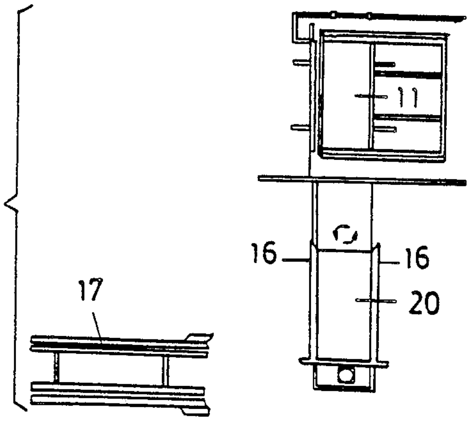
Figures 2, 3, 4, 5, 6:
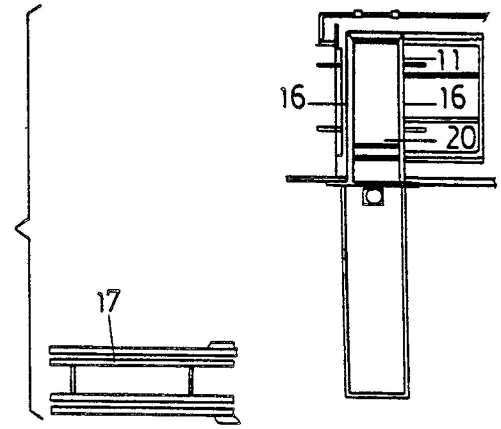
Figures 2, 3, 4, 5, 6, 7:
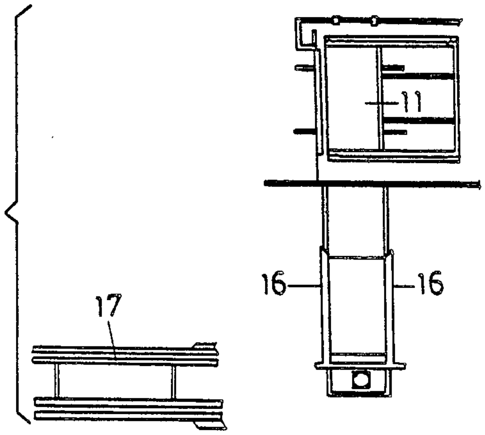
Figures 2, 3, 4, 5, 6, 7, 8:
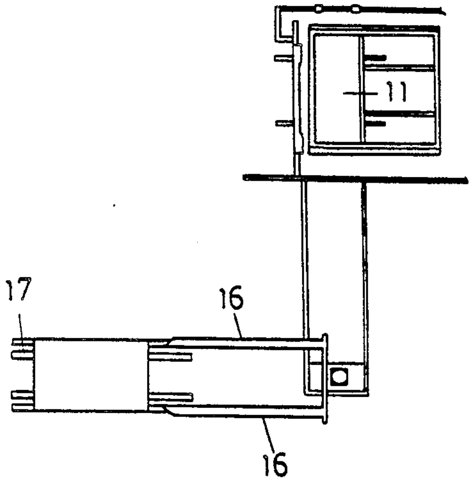
Figure 3A:
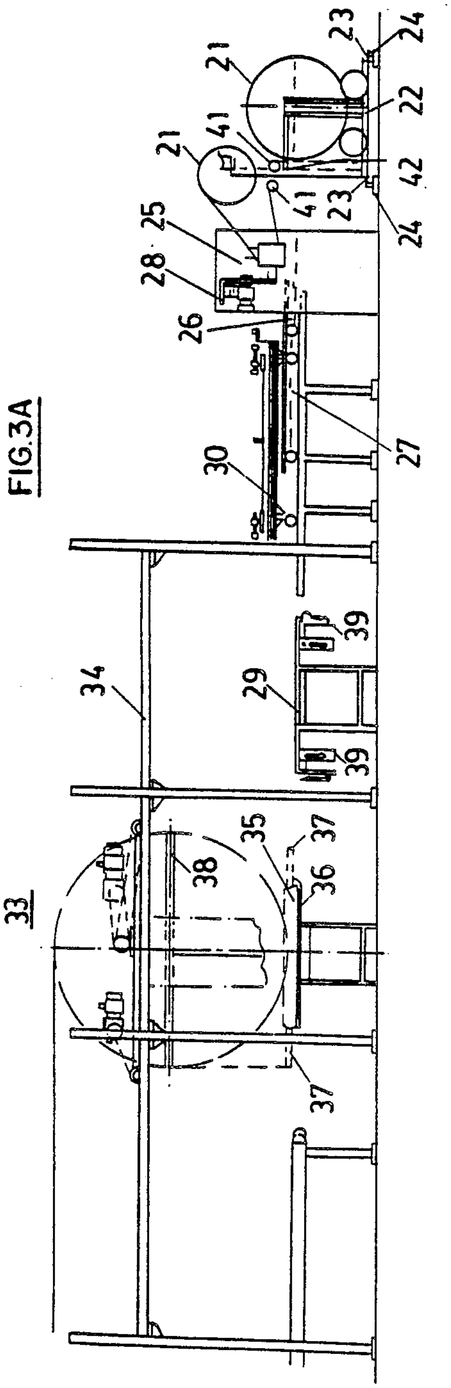
FIGS. 3(A) and 3(B) are plan and profile views of an installation for assembling mattresses according to a second embodiment of the invention, with certain improvements in the apparatus and in the process.
Figure 3B:
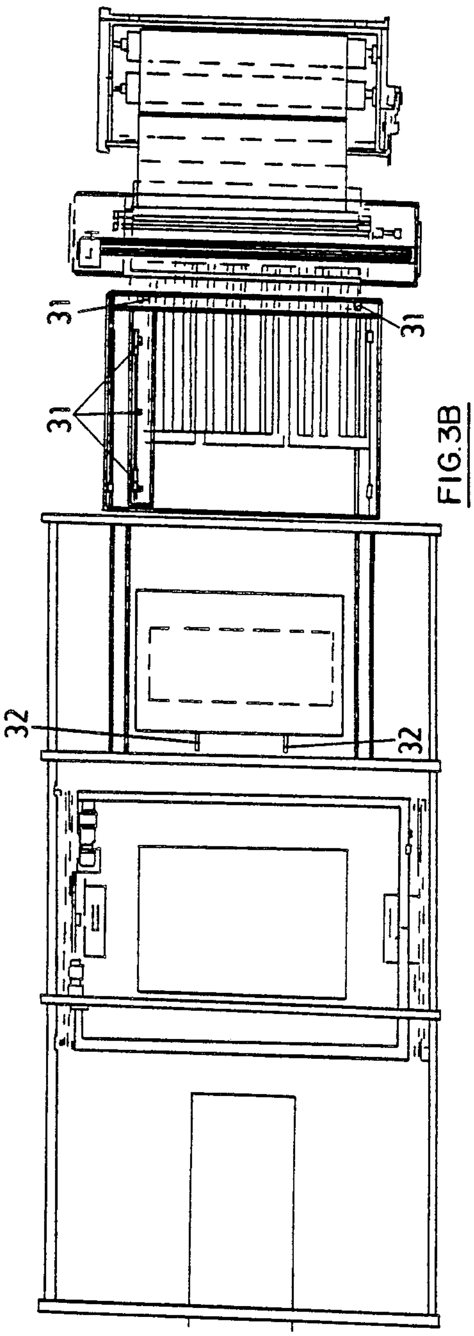

Then, FIG. 2-3 shows how the head of the robot, which includes the grippers 16, and the spring casing 20 rotate through a certain angle, the axis of the casing being positioned parallel with that of the folding unit 11. FIG. 2-4 shows how the robot moves forward until it meets the folding unit 11 and deposits the casing 20 on the visible cover and padding which are disposed thereon.

Once both the cover and the padding have been joined to the casing and the peripheral springs by adhesion and the application of pressure by the jaws, the robot with its casing moves back, rotating the grippers 16 and also the casing disposed between them through an angle of 180 degrees so that the opposite side can be assembled, as shown in FIG. 2-5. FIG. 2-6 shows how the robot moves forward again with the same casing 20 once it has been rotated so that the visible cover and the respective padding can be joined to the other surface of the casing.

Once the operation has been completed, the integrated frame of the mattress, once assembled, is withdrawn to a final productive stage, while the robot returns empty, finally turning as shown in FIGS. 2-7 and 2-8 so that the process of supplying another spring casing can be initiated.

FIG. 3 shows both a plane view and a profile view of an improved installation according to the invention. Despite the fact that certain elements are the same as those in FIG. 1, by convenience and ease of interpretation, the numbering given to them will be continued, with respect to FIGS. 1 and 2.

Reference number 21 denotes the spools which supply the internal shock absorber materials to be located between the visible casing of the mattress and the spring casing thereof, the spools being disposed on parallel axis and at different heights to facilitate superposition of the materials. The spools are carried by a frame 22, optionally being displaceable transversely with regard to movement of the material by its respective wheels 23 being supported on fixed guide rails 24. The frame is adapted to be displaceable and is actuated by pneumatic or hydraulic cylinders in order to achieve perfect centering of the materials to be supplied from the spools. The frame is controlled by photoelectric cells incorporated into the beginning of a stage 25. The cells are regulable and transversely displaceable by adaptation of the width of the material which is being supplied. These cells send a signal which, suitably processed, becomes transformed into a command for the cylinder which actuates the frame 22.

Avoiding undesired stretching of the material supplied by one of the spools 21, and as a considerable improvement, the material passes through an accumulator which comprises two top rollers 41 and a bottom roller 42 between which the material passes, the material forming a "V", and the bottom roller 42 being adapted for free vertical displacement. This bottom roller 42, the weight of which is compensated, exerts zero pressure on the material to be supplied, so avoiding possible stretching with an inevitable falsification of the amount to be cut off. Operation of the accumulator is achieved by raising the roller 42 and so diminishing the amount of material available with no need for any abrupt movement of the supply spool 21 which would cause stretching of the material. This spool will start to rotate slowly and gradually, so avoiding any possible deformation of the material as it is pulled off.

Inside stage 25 are a material pull-off means which, firstly superposing the material of the spools 21, leads the material to a point where they are deposited on a transfer unit 26.

In the stage 25, and once the material supplied reaches a predetermined magnitude, the supply of material is stopped. A top cutter 28, moving transversely from end to end with respect to the direction of material movement, cuts the material in question.

From the transfer unit 26, which has a series of parallel longitudinal spaces, there emerge conveyor belts which move at a low position 27, operating first, prior to cutting the material, by supplying and assisting with the transport of the material. The conveyor belts stop at the moment of cutting and finally resume their movement when the material has been cut, so that the material which has then been cut can be moved on to the opposite end of the unit.

The transfer unit 26, once the cut material has been placed on it, moves until it is situated above a folder 29. During the course of the movement, and taking advantage of the actual displacement of the unit until it is situated above the folding unit, a carriage 30 adapted for longitudinal displacement is situated in a position such that regulable strips of adhesive are added by orifices 31. Strips of adhesive extending in the longitudinal direction of displacement are then left on the material. Once the unit 26 is positioned over the folding unit 29, a second carriage is adapted to move transversely to carriage 30 and apply fresh regulable strips of adhesive by the orifices 31 in a direction which is crosswise to the direction movement of the material.

When the unit 26 reaches the extreme end of the folding unit 29, and before the transverse application of regulable strips of adhesive, grippers 32 undertake to hold fast the material which is carried. Once the unit 26 and the gluing carriage 30 are withdrawn to recommence the same process, the material carried then remains on the folding unit 29, or on the visible mattress cover previously added to the folding unit.

Once the material is situated above the folding unit, and once it can be constituted by the visible mattress cover and its interior, or only its interior, the second phase starts. A linearly displaceable automatic unit 33 is carried by a frame 34, and also is vertically displaceable. A spring frame 35 is picked up by jaws 37 of the unit 33, lifted by lift 38, and moved over the folding unit 29. The spring frame 35 is set without detaching it, over the material placed on the folding unit, at which time peripheral jaws 39 fold and fix the edges of the shock-absorbing material on the geometrical edges of the spring frame.

Afterwards, and if the pressure of the jaws which fix the spring casing has not been withdrawn, the automatic unit will lift the casing and rotate it through 180 degrees to lower it again onto the folding unit 29.

Previously, during the raising and turning over period, a new visible mattress cover and/or its appropriate inner shock absorber, will have been deposited, so that when the frame is lowered the folders carry out the same operation.

Once one or both sides of the mattress have been assembled, the automatic unit 33 will raise the spring casing and, undergoing displacement on the supporting frame 34, transport the casing to the final stage of production.

It should easily be mentioned that the automatic unit will resume the cycle of picking up and subsequently carrying a fresh spring frame.

I claim:

1. A mattress assembly installation, comprising:

a plurality of mattress padding material spools for supplying separate matress padding materials in a material supply direction;

a receiving stage positioned downstream of said spools for receiving the mattress padding materials from said plurality of spools such that the mattress padding materials are superposed;

cutting means for cutting superposed mattress padding material portions from the supply of the mattress padding materials from said spools, said cutting means moving transverse to said material supply direction;

a first gluing means for deposition regulable strips of adhesive on the superposed mattress padding materials in a longitudinal direction parallel to said material supply direction;

a second gluing means for depositing regulable strips of adhesive on the superposed mattress padding materials in a lateral direction perpendicular to said material supply direction, wherein said first and second gluing means together provide strips of adhesive at four sides of the superposed mattress padding materials portions;

a conveyor means for conveying said superposed mattress padding material portions; and a folding means for receiving an inverted mattress covering thereon, receiving said superposed mattress padding material portions from said conveyor means on said inverted mattress covering, and folding said superposed mattress padding material portions together with said inverted mattress covering onto a spring frame of a spring casing.

2. The mattress assembly as set forth in claim 1, and further comprising:

a robot means for carrying and positioning the spring frame above said folding means, said robot means comprising a horizontally movable robot that is pivotable about a vertical axis and capable of lifting and inverting the spring frame.

3. The mattress assembly installation as set forth in claim 1, wherein:

said receiving stage comprises a first table for receiving said mattress padding materials thereon;

said cutting means and said second gluing means simultaneously cut to form a cutting line between the separated superposed mattress padding material portions and the supply of mattress padding materials and deposit the regulable strips of adhesive on both the separated materials and the remaining materials of the supply materials on either side of the cutting line;

a second table is provided for receiving the separated superposed mattress padding materials after said cutting means and said second gluing means;

said conveyor means conveys said superposed mattress padding material portions from said second table to said folding means; and said folding means has a plurality of adhesive dispensing orifices for dispensing adhesive onto the inverted mattress covering.

4. The mattress assembly as set forth in claim 3, and further comprising:

a robot means for carrying and positioning the spring frame above said folding means, said robot means comprising a horizontally movable robot that is pivotable about a vertical axis and capable of lifting and inverting the spring frame.

5. The mattress assembly installation as set forth in claim 3, wherein:

said folding means comprises a plurality of folding jaws for folding the inverted mattress covering together with the separated materials onto a spring frame, whereby the adhesive applied to the inverted mattress covering and the separated materials join the inverted mattress covering and the separated materials onto the spring casing.

6. The mattress assembly installation as set forth in claim 5, wherein said folding means further comprises four sides and four said folding jaws on respective said sides of said folding means.

7. The mattress assembly as set forth in claim 6, wherein two of said jaws are contiguous and displaceably mounted, whereby said folding unit is adaptable to different widths and lengths of mattresses.

8. The mattress assembly installation as set forth in claim 1, wherein:

a frame supports said plurality of spools for supplying the mattress padding material at different elevations, said spools being disposed on said frame along parallel axes;

wheels are mounted said frame such that said frame is displaceable;

fixed guide rails support said wheels such that said frame is moveable thereon;

a fluid cylinder is operably connected to said frame for movement thereof for centering the mattress padding materials; and a control means is provided for controlling said fluid cylinder for regulating the transverse displacement of said frame, said control means comprising a plurality of control cells for detecting and providing a signal in response to the position of said spools to said fluid cylinder.

9. The mattress assembly installation as set forth in claim 8, and further comprising:

an accumulator receiving mattress padding materials from said spools and delivering said materials to said receiving stage, said accumulator having two upper rollers and a lower roller through which the mattress padding materials pass in a V-shape, said lower roller being vertically displaceably mounted and compensated to exert substantially no force on the mattress padding materials.

10. The mattress assembly installation as set forth in claim 8, and further comprising:

means for pulling the mattress padding materials off of said spools, superposing the mattress padding materials and delivering the mattress padding materials to said conveyor means.

11. The mattress assembly installation as set forth in claim 8, wherein:

said conveyor means comprising a plurality of conveyor belts conveying the mattress padding materials, stopping at a cutting position of said cutting means, and conveying after cutting of the materials to said folding means.

12. The mattress assembly installation as set forth in claim 8, wherein:

said conveyor means conveys the superposed mattress materials to said folding means;

said first gluing means comprising a movable carriage depositing said strips of said adhesive during movement of said conveyor means; and said second gluing means comprises a further movable carriage positioned above said carriage of said first gluing means.

13. The mattress assembly installation as set forth in claim 12, wherein:

said folding means further comprises a plurality of grippers thereon for folding the superposed mattress padding materials in place.

14. The mattress assembly installation as set forth in claim 8, and further comprising:

an automatic spring casing moving means, comprising a frame, a carriage linearly movable on said frame, a plurality of gripping elements on said carriage for gripping the spring casing, whereby the spring casing can be delivered to said folding means, rotated 180 degrees at said folding means, and removed from said folding means; and a plurality of peripheral jaws on said folding means for folding the superposed mattress padding materials onto the spring casing.

* * * * *